(12) United States Patent
Kobayashi

(10) Patent No.: US 6,210,157 B1
(45) Date of Patent: Apr. 3, 2001

(54) FUEL REFORMER COMBUSTION PROCESS

(75) Inventor: Hisashi Kobayashi, Putnam Valley, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/544,451

(22) Filed: Apr. 7, 2000

(51) Int. Cl.[7] ........................................ F27D 17/00
(52) U.S. Cl. ........................ 432/181; 432/28; 432/182
(58) Field of Search ........................... 432/28, 30, 179, 432/181, 182; 422/175, 178, 182

(56) References Cited

U.S. PATENT DOCUMENTS

| | | |
|---|---|---|
| 4,900,333 | 2/1990 | Bos ........................................ 48/197 |
| 4,976,611 * | 12/1990 | Knop et al. ........................... 432/181 |
| 5,365,863 * | 11/1994 | D'Souza ................................ 432/181 |
| 5,595,059 | 1/1997 | Huber et al. ......................... 60/39.02 |
| 5,810,581 * | 9/1998 | Martin et al. ......................... 432/181 |
| 6,019,597 * | 2/2000 | Martin et al. ......................... 432/181 |

OTHER PUBLICATIONS

Martin, "Regenerative Ceramic Burner Technology and Utilization", Industrial Heating, Nov. 1988, pp. 12–15.
Blazek, "Thermochemical Recuperation and Co–Firing", distributed Mar. 25 or 26, 1993.

* cited by examiner

*Primary Examiner*—Gregory A. Wilson
(74) *Attorney, Agent, or Firm*—Donald T. Black

(57) ABSTRACT

A regenerative furnace without flue gas circulation to the regenerator beds is heated by combusting synthesis gas with an oxidant. The synthesis gas is produced from steam and methane in a first regenerator bed, heated in the previous cycle while a second regenerator bed, cooled in the previous cycle, is heated by passing through it a hot flue gas from a source other than the furnace. Once the first regenerator bed is cooled through the endothermic chemical reaction of the steam and methane, it is heated by hot flue gas, while steam and methane are reacted in the second, now hot, bed thereby cooling it.

11 Claims, 1 Drawing Sheet

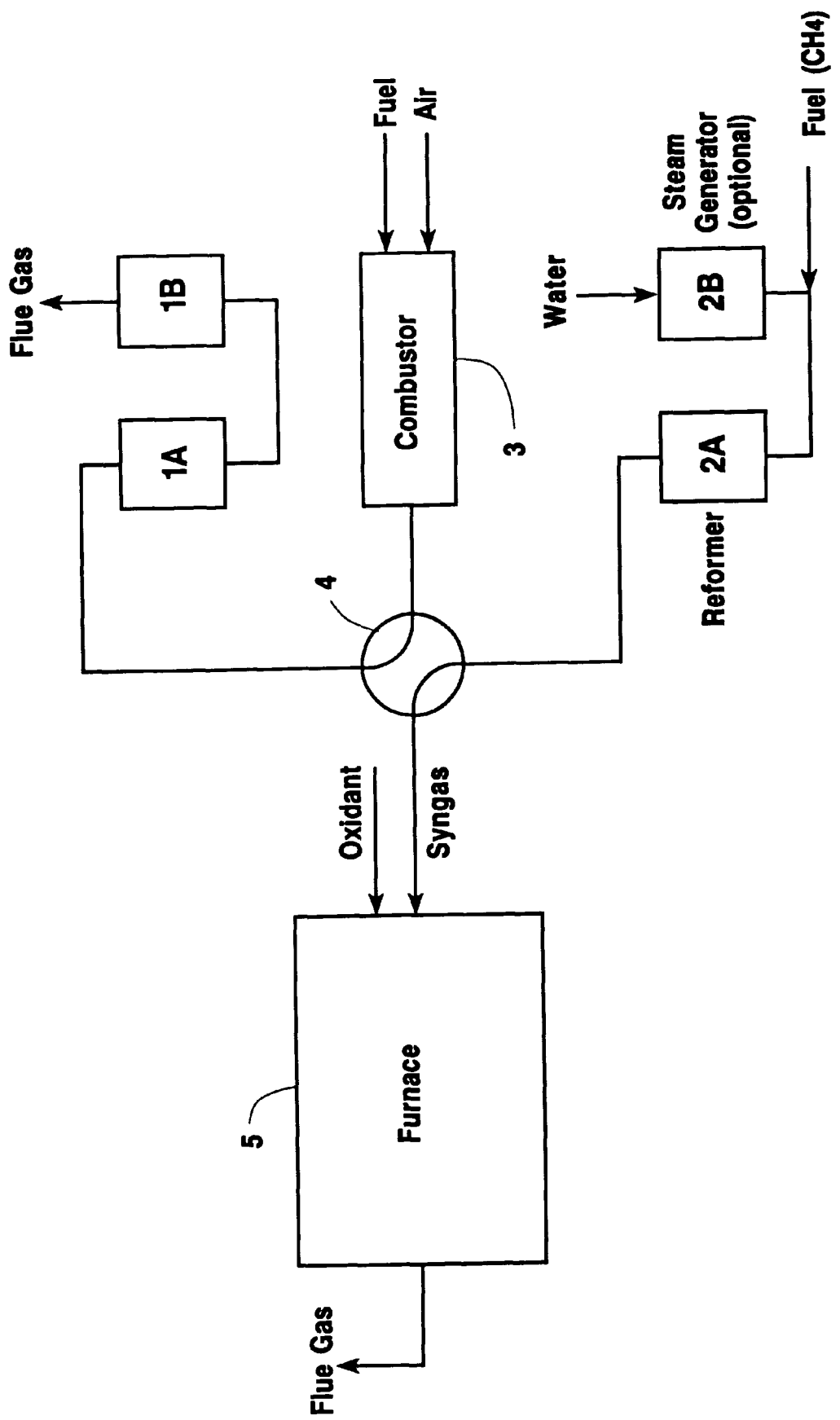

FUEL REFORMER COMBUSTION PROCESS

TECHNICAL FIELD

The invention is generally related to directly fired furnaces employing regenerator beds. More specifically, the invention is related to combusting in the furnace reaction products resulting from a chemical reaction carried out in the regenerator beds.

BACKGROUND ART

Conventionally, regenerators and recuperators are employed to exchange heat between two fluid streams. Regenerators are employed to provide a cyclic heat interchange, alternatively receiving heat from hot gaseous products of combustion and transferring it to, and thus preheating, the combustion air. Typically, regenerators have a heat reclamation bed made of or filled with a packing material that stores and transfers heat. While large checkerwork (refractory) regenerators have been known for decades, a more recent development has been the introduction of integral burner-regenerators, also known as regenerative burners.

Rapid cycle regenerative burners have been adopted for air fired furnaces due to their high thermal efficiencies, simple design, and the small size required for heat exchange. In general, regenerative burners are provided in pairs, with one unit operating in a combustion mode and the other in an exhaust or flue mode. For twin units A and B, for example, unit B may be operated as a burner while hot flue gases are cooled by being passed through the bed of unit A which is operated as "flue". When the bed of unit A has reached the targeted temperature, the flue gases are redirected to the bed of unit B, now operating as flue, while unit A is switched to burner mode; heat stored in the bed of unit A is recovered as the combustion air at ambient temperature is passed through the hot bed and is preheated. Once the bed of unit B reaches the targeted temperature, unit B is again switched to burner mode while hot exhaust gases are redirected to unit A.

One disadvantage associated with regenerative burners is the fact that they are limited to relatively clean combustion processes since waste gases that contain particulates and other impurities tend to plug or foul the bed.

An example of a process generating exhaust gas containing significant amounts of impurities is glass melting where the flue gas may contain dust, typically picked up from glassmaking materials, volatile condensable matter, as well as corrosive gases. Although the thermal efficiency of directly fired glass melting furnaces can be improved by replacing the combustion air with oxygen or with oxygen-enriched air, the use of oxygen adds to the overall operation cost. Generally, oxy-fuel glass melting furnaces are operated without flue gas heat recovery through the regenerator beds.

Efficiency improvements and cost reductions continue to be needed, therefore, for oxygen fired glass melting furnaces and for other furnaces for which the hot flue gas produced in the furnace is not passed through the regenerator beds.

Accordingly, it is an object of the invention to provide a process that improves the efficiency and can reduce the consumption of oxygen and fuel in such furnaces.

SUMMARY OF THE INVENTION

The above and other objects, which will become apparent to one skilled in the art upon a reading of this disclosure, are attained by the present invention which is:

A process for combusting in a furnace, reaction products formed in a chemical reaction, said process comprising:

(A) producing a cooled first regenerator bed by introducing reactants into a first regenerator bed and reacting the reactants in the first regenerator bed in an endothermic chemical reaction to form first reaction products;

(B) passing said first reaction products into the furnace to be combusted with an oxidant;

(C) producing a heated second regenerator bed by passing hot flue gas from a source other than the furnace through a second regenerator bed;

(D) cooling the heated second regenerator bed by introducing reactants into the second heated regenerator bed and reacting the reactants in the second regenerator bed in an endothermic chemical reaction to form second reaction products;

(E) passing said second reaction products into the furnace to be combusted with an oxidant; and (F) passing hot flue gas from a source other than the furnace through said cooled first regenerator bed.

BRIEF DESCRIPTION OF THE DRAWING

The sole FIGURE is a schematic diagram of one embodiment of a system useful for carrying out the invention.

DETAILED DESCRIPTION

In many furnaces, fuel is combusted in the presence of an oxidant to heat the materials being processed. The invention is particularly advantageous in furnaces heated by combusting a fuel with oxygen but can also be adapted for other applications and can be used, for example, in conventional air-fired furnaces or in furnaces fired with oxygen-enriched air. The invention can be used in glassmelting, steel processing and many other furnaces. It is particularly advantageous in directly fired systems which produce flue gases containing dust, particulates or other impurities.

The invention involves a furnace combined with a separate fuel reformer. A conventional catalytic steam reformer system can be used to reform the fuel and to produce hot synthesis gas or "syngas" comprising hydrogen and carbon monoxide. The invention is preferably used with rapid cycle regenerators as the reforming system with small bed size but also with typical commercial regenerators for glassmelting furnaces, which typically reverse every 20 to 30 minutes and have an average gas passage diameter of several inches.

The invention is useful for the operation of furnaces employing at least one regenerator system, each system having at least two regenerator beds, although more than two beds may be used. The beds typically comprise a refractory-lined container packed with a material that is effective in storing and transferring heat, which can provide adequate thermal shock resistance and can withstand the temperatures and pressure drops encountered in practicing the invention. Balls made of various metals, alumina, magnesia, mullite, AZS or zirconia-based ceramics are examples of the materials that can be used in the regenerator beds.

In the practice of this invention, the regenerator beds are employed, not only as heat interchangers, but also as reactors in which to carry out one or more chemical reactions thereby generating useful reaction products. Catalyst can be used in the bed material to promote the endothermic reactions and reduce the temperature of endothermic reactions.

In the preferred embodiment, the chemical reaction carried out in the regenerator beds is a steam reforming reaction. The reaction is endothermic and uses a hydrocarbon fuel (typically natural gas) and steam or carbon dioxide to form reaction products comprising carbon monoxide and hydrogen mixed with some water, typically in the form of water vapor, along with carbon dioxide, methane and possible other hydrocarbons. In idealized form, the steam reforming reaction that is carried out in the regenerator bed can be written as:

$$CH_4 + H_2O \rightarrow CO + 3H_2 \quad (1)$$

In addition to reaction (1) other endothermic processes may take place in the heated bed. Among them, fuel cracking is particularly undesirable since it produces carbon (or soot) deposits in the bed. By increasing the ratio of steam to fuel the sooting problem can be reduced. It is also possible to preheat oxidant in the same bed in a sequential manner after the fuel has been heated and reformed. By injecting into the bed some oxygen, the carbon is burned and the bed cleaned.

The reaction products, also known as synthesis gas or syngas, are passed to the furnace where they are combusted as fuel thereby heating the material processed in the furnace. The idealized stoichiometric combustion reactions taking place in the furnace can be written as:

$$CO + 3H_2 + 2O_2 \rightarrow CO_2 + 3H_2O \quad (2)$$

Although air may be employed to carry out reaction (2), it is a preferred embodiment of the invention to use a combustion oxidant having an oxygen content greater than 30 volume percent. Accordingly, the combustion oxidant may be oxygen enriched air with an oxygen concentration greater than 30 percent by volume, preferably greater than about 50 percent by volume; it is most preferred to carry out the combustion process using an oxidant having an oxygen concentration of at least 80 percent by volume. The oxidant may be oxygen obtained through the cryogenic or non-cryogenic separation of air or through an oxygen-producing chemical process.

For achieving low $NO_x$ emissions, it is preferred that the invention be practiced in the furnace using the combustion method disclosed in U.S. Pat. No. 5,076,779—Kobayashi.

The energy required by the endothermic steam reforming reaction is provided by heating and storing heat in the regenerator bed packing material prior to introducing the reactants (steam and a hydrocarbon such as methane) into the bed. Since, as discussed above, the invention is useful in conjunction with furnaces for which the furnace flue gas is not passed through the regenerator bed for heat recovery, the bed is preheated by other means. The regenerator bed may be heated by hot and relatively clean exhaust gas obtained from a combustion process other than that carried out in the furnace. For example, hot, relatively clean exhaust gas may be directed to the regenerator bed from a different section of the industrial facility.

Alternatively, air and fuel may be combusted specifically for the purpose of generating hot combustion products with which to heat the regenerator bed. Not only is the conventional combustion of air with a fuel such as natural gas or fuel oil very efficient, but such combustion generates combustion products that are relatively free of dust, particulates and other impurities that might plug or foul the beds. According to one preferred embodiment and as illustrated in the Figure, the air-based combustion process can be carried out in an in-line combustor.

It may be desirable to remove residual gases, carbon deposits or impurities left in the bed at the end of the reforming combustion cycle by purging the bed. Purging may also be provided at the end of the heating (regeneration) cycle. Steam, recycled cooled flue gas from the air-fuel combustion, or another suitable medium such as air and oxygen may be used to purge and clean the regenerator beds. By injecting into the bed some oxygen, along with the hydrocarbon fuel and stream reactants, the carbon is burned and the bed cleaned.

At least two beds are needed for an alternating cyclic process. For a furnace having two regenerator beds, steam and methane are injected into the first bed, preheated during the previous cycle, where they react to form syngas, typically hot, which is then passed from the first bed to the furnace to be combusted as fuel. Meanwhile, the second bed is heated, for example by flue gases from a source other than the furnace. Once the first bed reaches a temperature too low to sustain the endothermic steam reforming reaction, the beds are switched. Steam and methane are redirected to the second bed which now acts as a steam reformer while the first bed is heated. As before, once the second bed has become too cold, methane and steam are redirected to the first bed, now hot, while the second bed is being heated. Each regenerator bed alternates back and forth between a regeneration cycle during which it is heated to the desired temperature and a reforming combustion cycle during which it transfers the energy needed to heat the reactants and to carry out the endothermic reaction that produces the syngas to be used as combustion fuel in the furnace.

Purging of each bed and the recovery of the residual heat left in the bed packing material at the end of the endothermic reaction can be incorporated into the cyclic operation.

The steam required in the steam reforming reaction may be produced externally, for example in a different section of the industrial facility. Alternatively, it can be generated from water which is introduced into a hot regenerator bed and vaporized. Optionally and preferably, the hot regenerator bed in which the water is vaporized to steam can have been heated by passing therethrough flue gas from a source other than the furnace, as shown in the Figure.

The Figure illustrates a regenerator system having four beds and a cycle during which beds 1A and 1B are in the regeneration mode and are being heated by combustion products obtained from in-line combustor 3. Meanwhile, water is injected into bed 2B, preheated during the previous cycle, where it is vaporized. Steam produced in bed 2B and fuel (methane) are introduced into bed 2A, also preheated during the previous cycle, where they undergo a steam reforming reaction. Hot synthesis gas generated in the reaction is passed through valve means such as "four-way valve" 4 to the furnace where it is combusted as fuel.

Valve 4 is capable of controllably moving between two positions. In the first position, corresponding to a first mode of the process, flue gas from combustor 3 is directed to bed 1A (and to steam generating bed 1B, if present) while hot synthesis gas from bed 2A is directed into furnace 5. In the second position, corresponding to a second mode of the process, flue gas from combustor 3 is directed to bed 2A (and to steam generating bed 2B, if present) while hot synthesis gas from bed 1A is directed into furnace 5. Control of the valve position can be effected manually, or automatically, in response to the temperature conditions sensed in the bed being heated with flue gas from the combustor, all in a manner familiar to those experienced in this field.

Table 1 shows the results of calculations to illustrate the potential benefits associated with practicing the invention. The calculation assumes the idealized reforming reaction (1) with respect to baseline cases, described by equation (3) below, of an oxy-fuel fired furnace with flue gas temperature of 2400° F. and 2800° F. and no excess oxygen. No heat is recovered from the hot flue gas generated in the furnace.

$$CH_4 + 2O_2 \rightarrow CO_2 + 2H_2O \quad (3)$$

TABLE 1

Mass and Energy Balance with Fuel Reforming

| | | | | |
|---|---|---|---|---|
| FUEL TYPE | $CH_4$ | $CO + 3H_2$ | $CH_4$ | $CO + 3H_2$ |
| FUEL TEMPERATURE (F.) | 60 | 2000 | 60 | 20 |
| FUEL FLOW RATE (SCFH) | 1 | 2.765 | 1 | 2.753 |
| OXYGEN FLOW RATE (SCFH) | 2 | 1.3825 | 2 | 1.3765 |
| LOWER HEATING VALUE (BTU/HR) | 913 | 793 | 913 | 789 |
| SENSIBLE HEAT OF FUEL (BTU/HR) | 0 | 101 | 0 | 101 |
| TOTAL HEAT INPUT | 913 | 894 | 913 | 890 |
| FURNACE FLUE GAS TEMPERATURE (F.) | 2400 | 2400 | 2800 | 2800 |
| SENSIBLE HEAT IN FLUE GAS (BTU/HR) | 193 | 175 | 232 | 209 |
| AVAILABLE HEAT IN FURNACE (BTU/HR) | 720 | 720 | 681 | 681 |
| FUEL REDUCTION (%) | | 13.2 | | 13.5 |
| OXYGEN REDUCTION (%) | | 30.9 | | 31.2 |
| $CH_4$ REQUIRED FOR REFORMING (SCFH) | | 0.69125 | | 0.68825 |
| $H_2O$ REQUIRED FOR REFORMING (SCFH) | | 0.69125 | | 0.68825 |
| ENERGY OF REFORMING (BTU/HR) | | 162 | | 161 |
| SENSIBLE HEAT OF REFORMING (BTU/HR) | | 101 | | 101 |
| SUB-TOTAL (BTU/HR) | | 263 | | 262 |
| REFORMER FUEL REQUIREMENT (BTU)/HR | | 292 | | 291 |
| (SCFH) | | 0.320 | | 0.319 |
| (@ 90% EFFICIENCY IN TC REGEN) | | | | |
| TOTAL $CH_4$ REQUIRED (SCFH) | | 1.011 | | 1.007 |
| ENERGY OF $H_2O$ EVAPORATION (BTU/HR) | | 34 | | 34 |
| TOTAL (BTU/HR) | | 297 | | 296 |
| REFORMER FUEL REQUIREMENT (BTU/HR) | | 331 | | 329 |
| (SCFH) | | 0.362 | | 0.360 |
| (@ 90% EFFICIENCY IN TC REGEN) | | | | |
| TOTAL $CH_4$ REQUIRED (SCFH) | | 1.053 | | 1.049 |

According to the baseline case with flue gas temperature of 2400° F. for a fuel input of 1 SCFH of $CH_4$ at 60° F. (913 Btu LHV, where LHV stands for lower heating value) and 2 ft³ of $O_2$, the available heat to the furnace is 720 Btu/hr (78.9%) and 193 Btu/hr is lost with the flue gas.

Reductions in fuel and oxygen consumption can be significant if, however, the furnace is fired with oxygen and the hot syngas produced by the idealized reaction (1). In order to provide the same available heat of 720 Btu/hr, fuel input is reduced by 13.2% to 793 Btu/hr LHV and the oxygen requirement is reduced by 30.9% to 1.38 SCFH. In order to produce the hot reformed gases, however, for every 1 ft³ of $CH_4$ at 60° F. (913 Btu LHV), reaction (1) requires 234 Btu. The fuel input to produce 2.765 SCFH of reformed gases, assuming a 90% thermal efficiency of the reformer, is 292 Btu/hr. The sensible heat of the hot syngas is 101 Btu/hr.

Compared to the baseline case (913 Btu), the total nominal fuel input for both the methane steam reforming reaction and the air-fuel combustion reaction is now 1.01 SCF. An increase of about 1% in the overall fuel requirement is observed. If the energy required to vaporize water (50 Btu per 1 ft³ of $H_2O$) is added as well, the overall fuel requirement becomes about 1.05 SCFH or about 5% higher than the baseline.

Another benefit of the process is a reduction in the flue gas volume from the furnace, which in this illustration is about 8% (from 3 SCFH for the baseline case to 2.765 SCFH for the fuel reforming case). As flue gas containing particulates and condensable vapors are often required to be cleaned through an air pollution control system, reduced flue gas volume is a significant advantage because it reduces the size of flue gas treatment equipment.

A benefit which is at least as significant is that the oxygen requirement to the furnace is greatly reduced. The reduction is substantial. In this calculation the reduction is 30.9%, resulting in a significant overall cost savings. The reduction is also quite unexpected.

Columns 3 and 4 of Table 1 show similar calculations for a furnace with flue gas temperature of 2800° F. They illustrate slight improvements in fuel and oxygen reduction at higher temperatures.

The fuel oxygen consumption in the furnace can be further reduced by preheating the combustion oxidant.

The endothermic reforming reaction (1) is favored by high temperatures. Generally, in the absence of a suitable catalyst, no reforming reaction takes place once the bed temperature drops below about 1300° F. At least a portion of the residual thermal energy left in the bed following the reforming reaction can be recovered by passing the combustion oxidant through the bed thereby preheating it.

An additional advantage to passing an oxidizing gas such as oxygen through the bed is its role in cleaning the carbon deposits formed in the bed through fuel cracking.

Since a typical furnace has multiple regenerative burners, it may be advantageous to have conventional as well as reforming regenerative burners in the same furnace. According to one embodiment of the invention, the combustion oxidant may be preheated in the conventional regenerators while the mixture of steam and fuel are heated and reformed in parallel reforming regenerator beds.

Table 2 shows the results of calculations with oxygen preheating. If the combustion oxidant used is oxygen preheated externally to 2000° F., the fuel consumption for the furnace can be reduced by 19.3% to 737 Btu/hr and the oxygen consumption for the furnace can be reduced by 35.8% to 1.29 SCFH for the case of flue gas temperature at 2400° F. The $CH_4$ required for the reformer/$O_2$ heater is increased to 329 Btu/hr due to the additional energy required to preheat oxygen. The total fuel requirement is 1.00, i.e., the same as the baseline. Thus even though there is little change in the overall fuel requirement compared to the baseline case described above, oxygen preheating results in additional reductions in the oxygen consumption.

TABLE 2

Mass and Energy Balance with Fuel Reforming and Oxygen Preheating

| FUEL TYPE | $CH_4$ | $CO + 3H_2$ | $CH_4$ | $CO + 3H_2$ |
|---|---|---|---|---|
| FUEL TEMPERATURE (F.) | 60 | 2000 | 60 | 2000 |
| OXYGEN TEMPERATURE (F.) | 60 | 2000 | 60 | 2000 |
| FUEL FLOW RATE (SCFH) | 1 | 2.57 | 1 | 2.54 |
| OXYGEN FLOW RATE (SCFH) | 2 | 1.285 | 2 | 1.27 |
| LOWER HEATING VALUE (BTU/HR) | 913 | 737 | 913 | 728 |
| SENSIBLE HEAT OF FUEL (BTU/HR) | 0 | 94 | 0 | 93 |
| SENSIBLE HEAT OF OXYGEN (BTU/HR) | | 52 | | 51 |
| TOTAL HEAT INPUT | 913 | 883 | 913 | 873 |
| FURNACE FLUE GAS TEMPERATURE (F.) | 2400 | 2400 | 2800 | 2800 |
| SENSIBLE HEAT IN FLUE GAS (BTU/HR) | 193 | 162 | 232 | 193 |
| AVAILABLE HEAT IN FURNACE (BTU/HR) | 720 | 721 | 681 | 680 |
| FUEL REDUCTION (%) | | 19.3 | | 20.2 |
| OXYGEN REDUCTION (%) | | 35.8 | | 36.5 |
| $CH_4$ REQUIRED FOR REFORMING (SCFH) | | 0.6425 | | 0.635 |
| $H_2O$ REQUIRED FOR REFORMING (SCFH) | | 0.6425 | | 0.635 |
| ENERGY OF REFORMING (BTU/HR) | | 150 | | 149 |
| SENSIBLE HEAT OF REFORMING (BTU/HR) | | 94 | | 93 |
| ENERGY OF OXYGEN HEATING (BTU/HR) | | 52 | | 51 |
| SUB-TOTAL (BTU/HR) | | 296 | | 293 |
| REFORMER FUEL REQUIREMENT(BTU)/HR | | 329 | | 325 |
| (SCFH) | | 0.361 | | 0.356 |
| (@ 90% EFFICIENCY IN TC REGEN) | | | | |
| TOTAL $CH_4$ REQUIRED (SCFH) | | 1.003 | | 0.991 |
| ENERGY OF $H_2O$ EVAPORATION (BTU/HR) | | 32 | | 32 |
| TOTAL (BTU/HR) | | 328 | | 325 |
| REFORMER FUEL REQUIREMENT (BTU/HR) | | 365 | | 361 |
| (SCHF) | | 0.400 | | 0.395 |
| (@ 90% EFFICIENCY IN TC REGEN) | | | | |
| TOTAL $CH_4$ REQUIRED (SCFH) | | 1.042 | | 1.030 |

As shown in columns 3 and 4 of Table 2 for flue gas temperature of 2800° F., the savings increase slightly when the furnace temperature is higher. Thus the process provides better economics when applied to high temperature furnaces such as glass melting furnaces.

The following example is presented for illustrative purposes and is not intended to be limited.

A batch type steel reheat furnace is fired with four oxy-fuel burners using natural gas at a firing rate of 20MMBtu/hr. 20,000 SCFH (standard cubic feet per hour) of natural gas and 40,600 SCFH of commercial grade oxygen are used for combustion without any flue gas heat recovery systems. The average flue gas temperature is 2400° F. Each of the four oxy-fuel burners are replaced with the fuel reformer system connected to low $NO_x$ oxy-fuel combustion systems of the type shown in U.S. Pat. No. 5,076,779. The reformer bed material is made of 0.5 inch diameter alumina balls and heated to a maximum temperature of about 2200° F. at the end of the heating cycle. Each bed is sized to store 3,300 Btu per 40 second regeneration cycle. Each bed undergoes the following sequence: a fuel heating/reforming period of 19.5 seconds, a purge period of 0.5 seconds, an air combustion bed regeneration period of 19.5 seconds and a purge period of 0.5 seconds. Water is injected to generate 13,800 SCFH of steam in regenerator bed #1 and mixed with 13,800 SCFH of natural gas. The mixture is heated to an average temperature of 2000° F. and is endothermically reformed in the bed. The hot syngas generated in bed #1 and 28,000 SCFH oxygen are injected into the furnace. During the regeneration (or heating) period, 5,800 SCFH of natural gas is combusted with air and the regenerator bed is heated to 2800° F. with a large excess of air. Flue gas temperature at the downstream of the bed is controlled to less than 300° F.

If losses due to incomplete reforming are not taken into account, the oxygen savings in the furnace are as high as 31%. Less but still very significant savings are obtained when these effects are accounted for. Greater benefits may be expected with higher furnace temperatures.

Although the invention has been described in detail with reference to certain embodiments, it will be appreciated by those skilled in the art that there are other embodiments within the spirit and scope of the claims.

What is claimed is:

1. A process for combusting in a furnace reaction products formed in a chemical reaction, said process comprising:
    (A) producing a cooled first regenerator bed by introducing reactants into a first regenerator bed and reacting the reactants in the first regenerator bed in an endothermic chemical reaction to form first reaction products;
    (B) passing said first reaction products into the furnace to be combusted with an oxidant;
    (C) producing a heated second regenerator bed by passing hot flue gas from a source other than the furnace through a second regenerator bed;
    (D) cooling the heated second regenerator bed by introducing reactants into the second heated regenerator bed and reacting the reactants in the second regenerator bed in an endothermic chemical reaction to form second reaction products;
    (E) passing said second reaction products into the furnace to be combusted with an oxidant; and
    (F) passing hot flue gas from a source other than the furnace through said cooled first regenerator bed.

2. The process of claim 1 wherein at least one of the first and second reaction products comprises synthesis gas.

3. The process of claim 1 wherein the endothermic chemical reaction in at least one of the first and second regenerator beds is steam reforming.

4. The process of claim 1 wherein the oxidant has an oxygen concentration greater than that of air.

5. The process of claim 1 wherein the hot flue gas passed through at least one of the first and second regenerator beds is produced by air-fuel combustion.

6. The process of claim 1 wherein the reactants passed into at least one of the first and second regenerator beds comprise methane and water.

7. The process of claim 6 wherein the reactants further comprise an oxidant.

8. The process of claim 1 further comprising passing purging gas through at least one of the first and second regenerator beds.

9. The process of claim 1 wherein the hot flue gas in step (C) and step (F) are from the same source.

10. The process of claim 9 wherein the process repeatedly alternates between a first mode wherein steps (A), (B) and (C) are carried out, and a second mode wherein steps (D), (E) and (F) are carried out.

11. The process of claim 10 wherein said first and second reaction products and said hot flue gas from said source are fed to a valve means which controllably alternates between a first position wherein said first mode is carried out and a second position wherein said second mode is carried out.

* * * * *